March 4, 1969    K. N. HASENBANK    3,430,424
EDGE TRIMMER
Filed Aug. 6, 1965
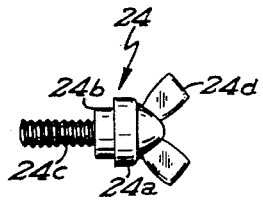
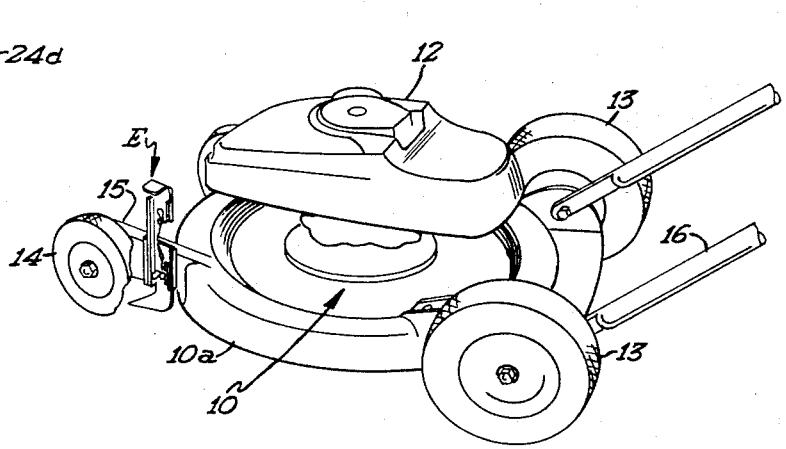
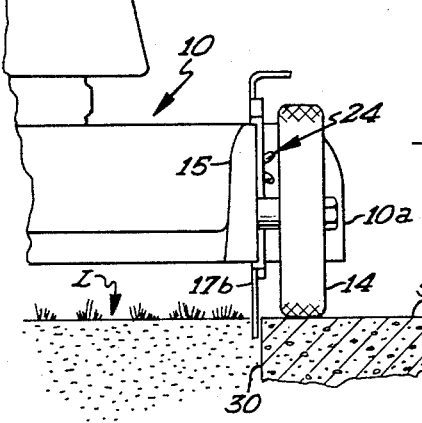
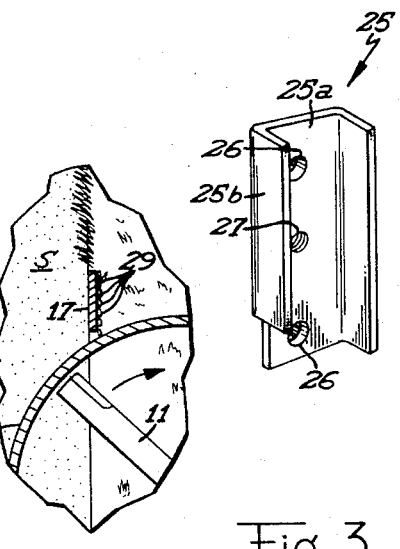
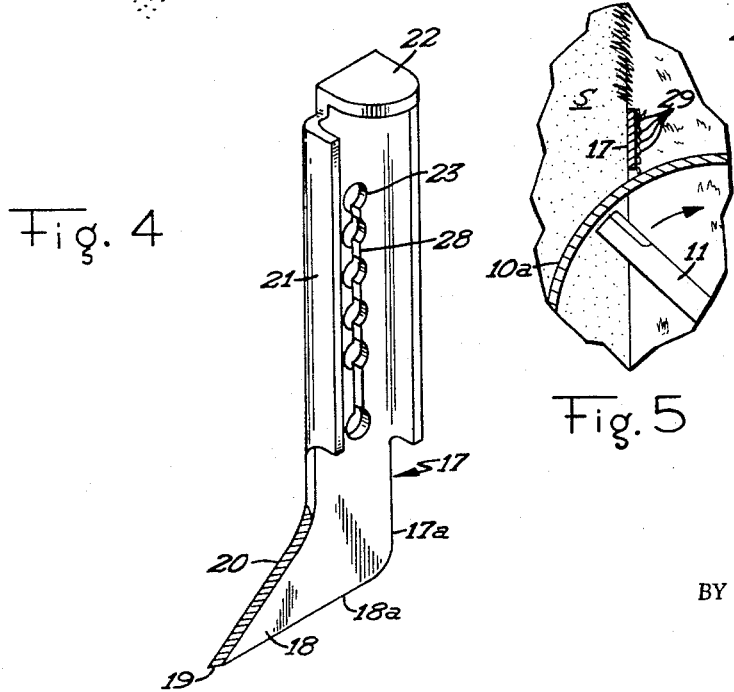
INVENTOR.
KENNETH N. HASENBANK
BY
ATTORNEY

United States Patent Office 3,430,424
Patented Mar. 4, 1969

3,430,424
EDGE TRIMMER
Kenneth N. Hasenbank, Minneapolis, Minn., assignor to Toro Manufacturing Corporation, Minneapolis, Minn., a corporation of Minnesota
Filed Aug. 6, 1965, Ser. No. 477,778
U.S. Cl. 56—255   1 Claim
Int. Cl. A01d 55/18

ABSTRACT OF THE DISCLOSURE

An edging blade mounted on a rotary mower forwardly of the axis of rotation of the cutting blade and lying in a plane intersecting the cutting orbit of the cutting blade, the edging member having a lower forwardly tapered blade portion with an upwardly and rearwardly inclined leading knife edge which is selectively vertically adjustable to positions below and/or above the level of the mower wheels. The inclined leading edge lifts and elevates low lying grass along the edge of a lawn and delivers it to the cutting blade of the mower in a generally upright condition for cutting by said blade.

---

This invention relates to an edge trimming attachment for lawn mowers particularly those of the rotary type, which enables low lying grass along the edge of a lawn to be neatly trimmed and cut by the mower.

The invention is particularly applicable to the trimming of low lying grass which overlaps or overlies hard surfaces such as sidewalks, driveways, curbs and the like which frequently border lawns, and to grass which extends down into channels or grooves formed between the edge of a lawn and the bordering surface and which is not cut by conventional mowers. This low lying edge grass must usually be trimmed by means of hand clippers or other special types of edge trimmers not associated with the mower.

Therefore, it is an object of this invention to provide an edging attachment for a lawn mower which will lift the low lying grass along the edge of a lawn and position same for cutting by the mower blade.

Another object is to provide an edging attachment of the type described which is capable of operating below the wheels and between the lawn turf and an adjacent surface bordering the lawn so as to be able to reach under and lift up and position for cutting low lying grass which either overlaps the adjacent surface or extends down into a groove between the turf and adjacent surface.

Still another object is to provide an edging attachment of the type described which includes a vertical grass positioning blade which extends below the mower wheels and is oriented in the direction of travel and which is adapted to readily cut or move through the turf abutting an adjacent lawn bordering surface so as to form a narrow attractive groove along the edge of the lawn and to guide the movement of the mower to facilitate the forming of a substantially perfectly straight trimmed edge along the lawn.

Still another object is to provide an edging attachment for a rotary mower which is mounted outboard of the cutter blade housing and which includes a generally vertical grass positioning blade portion which is adapted to lift the low lying grass and hold same in an elevated position ahead of, and in a plane intercepting the cutting orbit or swath of, the cutter blade and in such a position that the grass will be subjected to the airlift action effected by the rotation of the cutter blade within the housing, and the cutting action of the blade itself.

These and other objects and advantages of the invention will be more fully understood from the following description made in connection with the accompanying drawings wherein like character references refer to the same parts throughout the several views, and in which:

FIGURE 1 is a perspective view of a rotary lawn mower having an edging attachment of this invention mounted thereon, FIGURE 2 is a partial front view of FIGURE 1, FIGURE 3 is a perspective view of a bracket for mounting the edging attachment on the mower, FIGURE 4 is a perspective view of the edging attachment itself, FIGURE 5 is a top plan view with portions of the housing and attachment broken away and showing the relationship of the edging blade to the cutter housing, and FIGURE 6 is a side elevational view of a fastener for mounting the edging attachment on the mower.

Referring to the drawings, a typical rotary mower is shown having the edging attachment E of this invention mounted thereon. The mower includes an inverted cupped generally circularly shaped cutter blade housing 10 having a rotatable cutter blade 11 mounted therein for rotation about a vertical axis, the blade being driven by engine 12 mounted atop the housing. The mower further includes a pair of rear wheels 13 and pair of front wheels 14, each front wheel being mounted on the front end of an elongate frame member 15. A handle 16 is connected to the rear end of the mower and extends upwardly and rearwardly therefrom for steering and guiding the mower. The housing also includes a discharge opening (not shown) formed in the skirt on the right side thereof for discharging the clippings laterally thereof, said skirt enclosing substantially the entire orbit of the mower blade.

The edging attachment E constituting one preferred embodiment of this invention is mounted on elongate frame member 15 outside and ahead of the cutter housing and inboard of the front wheel 14.

The edger E includes an upstanding elongate uniplanar flat sided, relaitvely transversely narrow grass positioning blade 17 which lies in a vertical plane paralleling the direction of travel and intercepting the cutting orbit of the mower cutter blade 11.

The lower end portion of the positioning blade has a forwardly extending, tapered foot 18 which has a substantially straight horizontal lower edge 18a and which terminates in a sharp pointed tip 19 at the extreme leading end thereof. The upper leading edge 20 of said foot is inclined upwardly and rearwardly from the tip 19 and is beveled or sharpened to provide a cutting or knife edge. A pair of vertical elongate parallel reinforcing flanges 21 extend outwardly from the front and rear marginal edges of the upper portion or shank of the blade and the extreme upper end portion of the blade is bent outwardly to form a handle 22 to facilitate vertical adjustment of the edger. The upper portion or shank of the blade is also provided with a vertical series of openings 23 for receiving a fastening bolt 24, said fastening bolt being selectively insertable in said openings so as to selectively hold the edger blade in a variety of adjusted vertical positions, including below, at, or above wheel level.

To reinforce the edger and to hold same rigid against turning or twisting during use, a channel shaped bracket 25 is provided which is mounted on the frame member 15 prior to the mounting of the edger. The bracket is mounted vertically on the frame member 15 by means of fasteners (not shown) inserted through openings 26 formed in the web 25a of the bracket. The web is also provided with a threaded opening 27 for receiving the fastener 24 which secures the edger to the bracket and the mower frame. The side walls 25b extend outwardly from the frame member 15 and enclose the edger therebetween so that the side walls 25b are in contiguous sliding relationship with the flanges 21 of the positioning blade so as to hold and support same and yet permit the edger to be slid up and down relative thereto to permit vertical adjustment thereof.

The edger is preferably mounted so that the rear edge 17a of the blade is closely adjacent to the depending flange or skirt portion 10a of the cutter housing so that the blades of grass are held in a substantially upright position by the trailing inner face 17b of the blade so that they will come under the influence of the airlift action beneath and within the cutter housing immediately after they are released by the blade and make their entry into the cutter housing so that they will be acted on and held upright by the airlift action within the housing and will be available for cutting by the mower blade 11. For most effective results, the rear edge 17a of the blade should be no more than one inch from the cutter housing.

Thus, the leading tapered foot portion 18 of the blade is adapted to reach underneath the low lying grass and raise same along the inclined edge 20 thereof, and deliver the raised grass to the trailing vertical inner face 17b of the blade which holds the grass in substantially upright position until it releases the grass to the cutter housing and the action of the mower blade. Although the grass is released by the positioning blade outside the cutter housing, the rear edge of the positioning blade is close enough to the housing so that, combined with the rate of forward movement of the mower, and the speed of rotation of the mower blade, the released grass enters the housing and comes under the influence of the airlift therein and is subjected to the cutting action of the mower blade before the grass has an opportunity to return to its original low lying status. The foregoing can be best appreciated by an examination of FIGURE 5, wherein it can be seen that the upright blades of grass 29 held and positioned by the positioning blade 17 are released immediately ahead of the skirt 10a of the cutter housing and the mower blade 11, the outer end of which operates in close spaced relationship to said skirt so that the grass enters the housing and is cut by the mower blade almost instantaneously after release by the positioning blade 17.

In use, the edger blade is intially vertically adjusted to the height or depth desired for travel along the edge of the lawn. FIGURE 2 illustrates one typical example of how the edger is used. In FIGURE 2, the left front wheel of the mower is shown traveling on a hard surface S (such as a sidewalk) bordering a lawn L. The foot of the edger blade is positioned below the lower most level of the mower wheels and below the turf level and below the hard surface S and is adapted to travel through the turf of the lawn immediately adpacent to or against the vertical wall 30 of the hard surface in parallel relationship thereto. As the mower travels along the marginal edge portion of the lawn, the inclined knife edge 20 of the blade lifts the low lying grass and directs same to the inner face 17b of the positioning blade which hold the lifted grass in an upright position and makes it available to the airlift action within the housing and the cutting action of the mower blade. In some instances, the low lying grass will have become attached to the hard surface and will resist lifting thereof by the edger blade. When this occurs, the knife edge of the inclined surface 20 will cut the grass rather than lift same for subjection to cutting by the mower blade. Also, turf which may have extended onto the top of the hard surface will be cut off so as to provide a straight and neatly trimmed turf edge along the hard surface. Thus, the edger attachment of this invention serves the dual function of trimming the edge of the turf as well as raising the low lying grass for proper cutting thereof by the mower. The flat outer face of the edger blade also serves as a guide surface for engaging the vertical wall of the hard border adjacent the lawn, to guide the movement of the mower and assure cutting and forming a straight edge on the lawn.

When the edging has been completed, the fastener 24 is loosened sufficiently to enable the blade to be raised above the level of the wheels to an inoperative transport position.

In the illustrated embodiment, the vertical adjustment of the edger blade is accomplished without completely detaching or removing any of the parts and, in fact, can be accomplished simply by loosening of the fastener 24 without completely detaching same. To accomplish this, the fastener 24 is a double headed bolt having an outer head 24a which is adapted to bear against the outer face of the edger blade, a smaller cylindrical head 24b which is adapted to be selectively seated in any one of the blade openings 23 and a further reduced threaded inner end portion 24c which is adapted to be inserted in and cooperatively engage the threaded opening 27 in the bracket 25. The fastener is also provided with a wing type handle 24d for manipulating same. Thus, to vertically adjust the edger blade, the fastener 24 is loosened sufficiently to withdraw the head 24b from a blade opening 23 with the threaded portion 24c remaining in engagement with the threaded opening 27 in the bracket 25. Vertically aligned slots are slightly larger than the threaded portion 24c of the fastener so as to slidably receive same but smaller than the openings 23 so that once the head 24b of the fastener has been withdrawn from an opening 23, that the threaded portion 24c can travle through slots 28 to enable the fastener to be positioned in a new blade opening 23, to achieve the desired height adjustment of the edger blade.

The edger blade can be positioned anywhere transversely of the mower so long as the grass positioning portion thereof lies within a plane which intercepts the cutting orbit of the mower blade so that the uplifted grass will lie in the path of the oncoming mower blade and be cut thereby when released by the edger attachment.

Also, the edger attachment may be positioned anywhere longitudinally of the mower so long as it accomplishes the intended purpose of making the low laying grass available to the cutting edge of the mower blade. In most instances, however, this can be most conveniently accomplished by positioning the blade forwardly of the axis of rotation of the mower blade and the cutter housing. If desired, the edger blade may be adjusted so as to operate at the level of the mower wheels, rather than below.

Thus, from the foregoing, the advantages of this invention are readily apparent. The edging attachment is of simple and inexpensive design and construction, and can be readily mounted on any type of rotary mower. The attachment readily lifts the low lying fringe grass and positions same in an upright position and makes same readily available to the cutting action of the mower blade, cuts away any grass which may have become attached to the surface adjacent the lawn, cuts a neat groove in the turf adjacent said hard surface if no groove previously existed, conveniently rides in and lifts grass which may have grown downwardly into an already formed channel adjacent the margin of the lawn, cuts away any surplus turf which may have spread out over the adjacent hard surface, serves as a convenient guide for the directional movement of the mower so that a substantially perfectly straight edge can be formed, and can be quickly and easily adjusted between a plurality of operative positions and an inoperative transport position.

The term "wheel level" as used herein refers to the lower most or ground engaging portion of the mower wheels.

It will also be noted that the edger attachment is located in a position remote from the clipping discharge opening of the housing, so that it is not in the path of the clippings or the air stream carrying same.

It will, of course, be understood that various changes may be made in the form, details, arrangement and proportions of the various parts without departing from the scope of this invention.

What is claimed is:
1. In combination with a wheel supported rotary mower,
   a vertical channel shaped bracket rigidly mounted on said mower and facing laterally outwardly thereof,
   an elongate vertical edging member,
   the upper end portion of said edging member being channel shaped and telescopically seated in said bracket with the web portions of said channels in face-to-face engagement and the sides thereof in contiguous relationship,
   the lower end portion of said edging member comprising a grass lifting and positioning substantially uniplanar blade constituting a continuation of the web of the channel portion of the edging member,
   said blade lying in a vertical plane paralleling the direction of travel and intersecting the cutting orbit of the mower blade,
   said positioning blade having a straight horizontal bottom edge and an upwardly and rearwardly inclined grass lifting leading edge which is substantially coterminous with said bottom edge,
   the web of said edging member having a vertical series of openings formed therein for selectively receiving a fastening bolt attached to said mower for vertically adjusting the edging member and holding the blade thereof in a plurality of vertical positions,
   one of said positions being one in which said positioning blade is disposed below the mower wheels and is adapted to travel adjacent to and outwardly of the marginal edge of a grassy plot and raise grass overlapping said edge for cutting by the mower blade.

References Cited

UNITED STATES PATENTS

| | | | |
|---|---|---|---|
| 2,759,319 | 8/1956 | Smith | 56—256 |
| 2,917,890 | 12/1959 | Thomas | 56—25.4 |
| 3,003,301 | 10/1961 | Koon | 56—25.4 X |
| 3,197,951 | 8/1965 | Zick | 56—255 |
| 3,231,024 | 1/1966 | Lazich | 172—14 |

ANTONIO F. GUIDA, *Primary Examiner*.